United States Patent [19]

Sandler et al.

[11] 4,068,262
[45] Jan. 10, 1978

[54] AUXILIARY VARIABLE COORDINATE SONIC DISPLAY SYSTEM

[76] Inventors: Michael E. Sandler; Jeffrey C. Rodman, both of 20218 Gresham St., Canoga Park, Calif. 91306

[21] Appl. No.: 755,781

[22] Filed: Dec. 30, 1976

[51] Int. Cl.² .............................................. H04N 9/02
[52] U.S. Cl. ..................................................... 358/82
[58] Field of Search ............................. 358/21, 81, 82

[56] References Cited

U.S. PATENT DOCUMENTS

| | | | |
|---|---|---|---|
| 3,627,912 | 12/1971 | Hearn | 178/5.4 R |
| 3,723,652 | 3/1973 | Alles et al. | 179/1 VS |
| 3,990,105 | 11/1976 | Fast | 358/82 |
| 4,001,880 | 1/1977 | Delikat | 358/82 X |

*Primary Examiner*—Robert L. Richardson
*Attorney, Agent, or Firm*—Paul H. Ware

[57] ABSTRACT

Method and apparatus for creating a dynamic image on a television receiver display screen reflecting mood and character of music. Methods of pattern generation and color modulation are described. The pattern as seen by a viewer is a derived X-Y coordinate plot. The invention contemplates a format translator which is defined as a memory that samples an audio waveform periodically, determines the screen position corresponding to each sample, and stores video pulses in memory locations corresponding to those screen positions. The memory is then read in a line-by-line format for television display. The memory is thus written into in an X-Y format and read out in a raster scan format. Symmetry and variable image change rate can be employed in order to produce a pattern with pleasing effects. Image color is varied by shifting the phase of the chrominance sub-carrier as a function of the music envelope. Image color and intensity formation are then combined in an output mixer to produce a standard composite video output signal.

8 Claims, 7 Drawing Figures

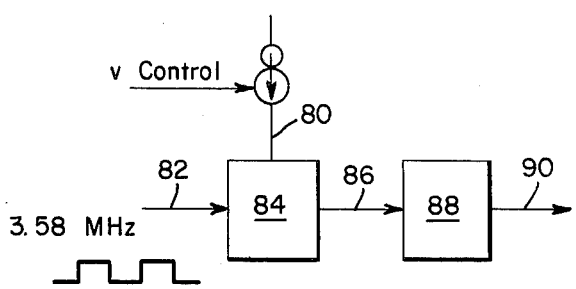
Fig. 3.
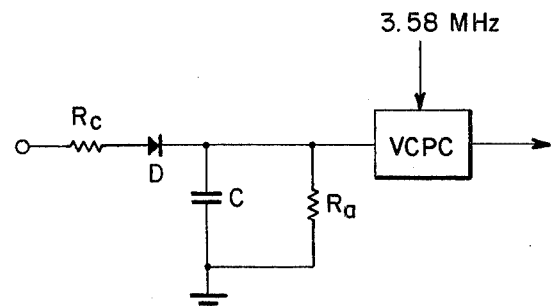
Fig. 4.
Fig. 5.
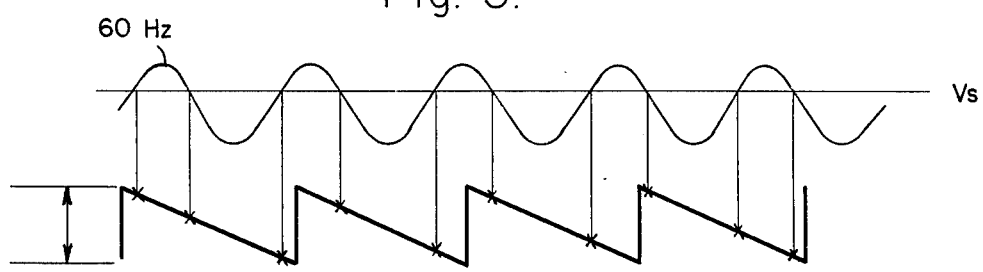
Fig. 7.
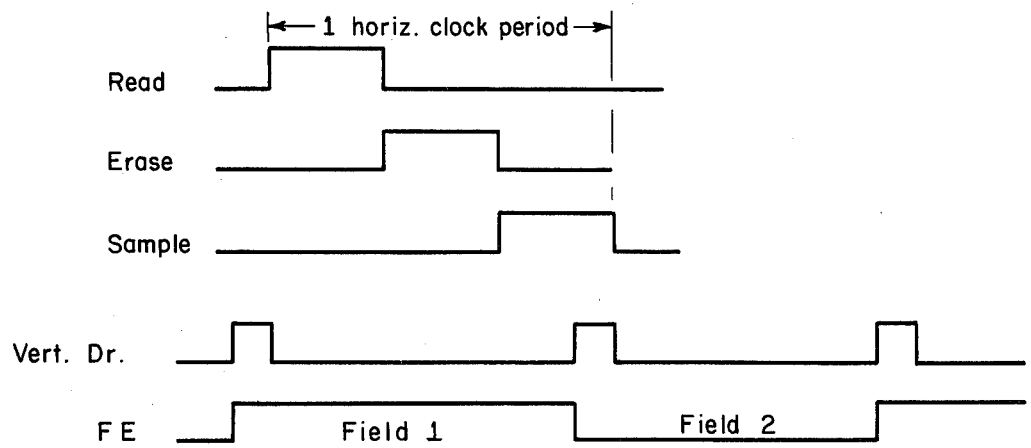

AUXILIARY VARIABLE COORDINATE SONIC DISPLAY SYSTEM

BACKGROUND OF THE INVENTION

1. Field of the Invention

The invention relates generally to apparatus for converting sound into configurations portraying that sound and more particularly to a system for transforming audio signals into a form suitable for reproduction on a television viewing screen, thus entertaining a viewer with varying visual patterns.

2. Description of the Prior Art

It is old in the art to use cathode ray tube oscilloscopes for the display of geometric patterns. The simultaneous displacement of two sinusoids, for example, results in the display of Lissajous figures determinative of a harmonic relationship between the two applied sinusodial signals. Prior art devices can generally be described as belonging in either one of two categories. In the first category, there is the X-Y type of display system that was connected directly to the cathode ray tube of the television receiver thus requiring either customizing the television circuitry or the origination of circuitry using the cathode ray tube of the televison receiver but not the internal circuitry. Such a system creates unduly jumbled images due to the complexity of the input waveforms over wide frequency ranges. The resultant images were thus so lacking in pattern, that an observer could not distinguish unique patterns related to music making the display tiresome and unexciting. One prior art device disclosed a color interpretation system in which music signals were processed and then furnished by way of separate paths to a single tri-color picture tube in a television receiver. Each path in this system affected one of the control electrodes of the picture tube. Such extensive modification of television receivers under this system was required that many people were discouraged from purchasing such systems and enjoying displays of this type because of the expense involved in the modification and the increase in the possibility of more frequent servicing. Such extensive modifications served to render what might have otherwise been routine maintenance practically impossible. Other systems in the second category define devices which are compatible with normal television sets in that they connect directly to the antenna input terminals, however, most of these use external pattern generators. These systems are also quite complicated in structure and the images produced are generally lacking in excitement and variety. A reliable and inexpensive system for processing an audio source into a visual representation on a television receiver without necessitating alterations or modifications of either the audio source or the television receiver has not been available heretofore. It would thus be of great advantage to the art to provide a reliable and inexpensive system for uniting audio signals with a television receiver so as to provide a pleasing display thereon.

SUMMARY OF THE INVENTION

The system of the invention creates a dynamic image on a television display screen that reflects the mood and the character of music. System operation comprises pattern generation and color modulation. The patterns result from variable coordinate plots of audio channels in an X-Y mode. Incoming channels are processed by band pass filters to make an image more pleasing and to reduce susceptibility to spurious components such as rumble and noise. At least one channel is then phase shifted so as to produce an attractive display of monophonic signals. At this point in the operation, the outputs of the two channels can be viewed on an X-Y display format. However, in order to present the signals on a standard television set, that is, in raster scan format, a format translator such as contemplated by the invention must be employed.

A format translator, as contemplated by the invention, is a memory that periodically samples an audio waveform, determines what screen position corresponds to each sample, and then stores video pulses in memory locations corresponding to those screen positions. The memory is then read in a line-by-line format for television display. The memory is thus written into in X-Y format and read out in raster scan format. The image as produced by the system can be symmetrical about either or both X and Y axes, the latter symmetry being commonly referred to as quarter symmetry. This kind of symmetry produces pleasing visual effects. The rate at which images can be changed is variable, in one embodiment, from 30 different patterns per second, at which speed the eye sees an effect of constant motion, to rates of one per second or slower, where the eye can appreciate the details of each pattern more fully. In the system of the invention image color is varied by shifting the phase of the chrominance sub-carrier as a function of the audio envelope. Image color and intensity information are then combined in an output mixer to produce a standard composite video output signal.

It is thus an object of the present invention to display audio signals on an unmodified television viewing screen.

It is another object of the invention to create a dynamic image on a television display screen that reflects the mood and the character of an audio signal.

It is a further object of the present invention to vary image color so as to present a more pleasing and varied display.

The foregoing objects, features, and aspects of the present invention will be evident from the detailed description that follows hereinafter when read with reference to the appended drawings.

BRIEF DESCRIPTION OF THE DRAWINGS

FIG. 3 is an explanatory block diagram as contemplated in the invention.

FIG. 4 is an explanatory circuit diagram as contemplated in the invention.

FIG. 5 is an explanatory waveform diagram.

FIG. 7 is a timing diagram showing both vertical and horizontal timing pulses.

DETAILED DESCRIPTION

Although specific embodiment of the invention will now be described with reference to the drawings, it should be understood that such embodiments are by way of example only and merely illustrative of but a small number of the many possible specific embodiments which can represent applications of the principles of the invention. Various changes and modifications obvious to one skilled in the art to which the invention pertains are deemed to be within the spirit, scope and contemplation of the invention as further defined in the appended claims.

Figure 1:
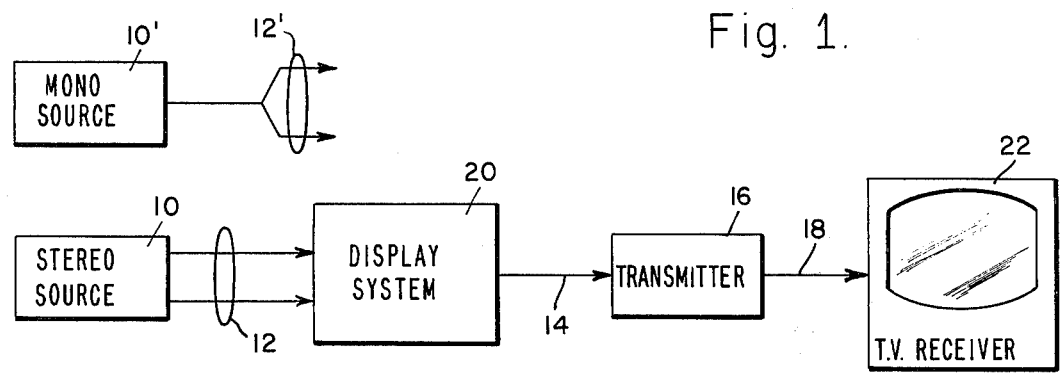
FIG. 1 is a conceptual block diagram of the invention in its relationship to those systems with which it is used.

Referring to FIG. 1, the overall relationship of the invention to peripheral systems is illustrated. An audio source denoted generally as 10 for a stereo audio source or 10' as a monophonic audio source may be furnished to the system of the invention 20 by means of composite lead 12 or 12'. After processing by the system of the invention, the signal is then furnished by means of lead 14 to a transmitter 16 which will be unnecessary for a receiver that has a direct video input. The output of transmitter 16 is furnished by means of lead 18 to the antenna terminals of television receiver 22.

Figure 2:
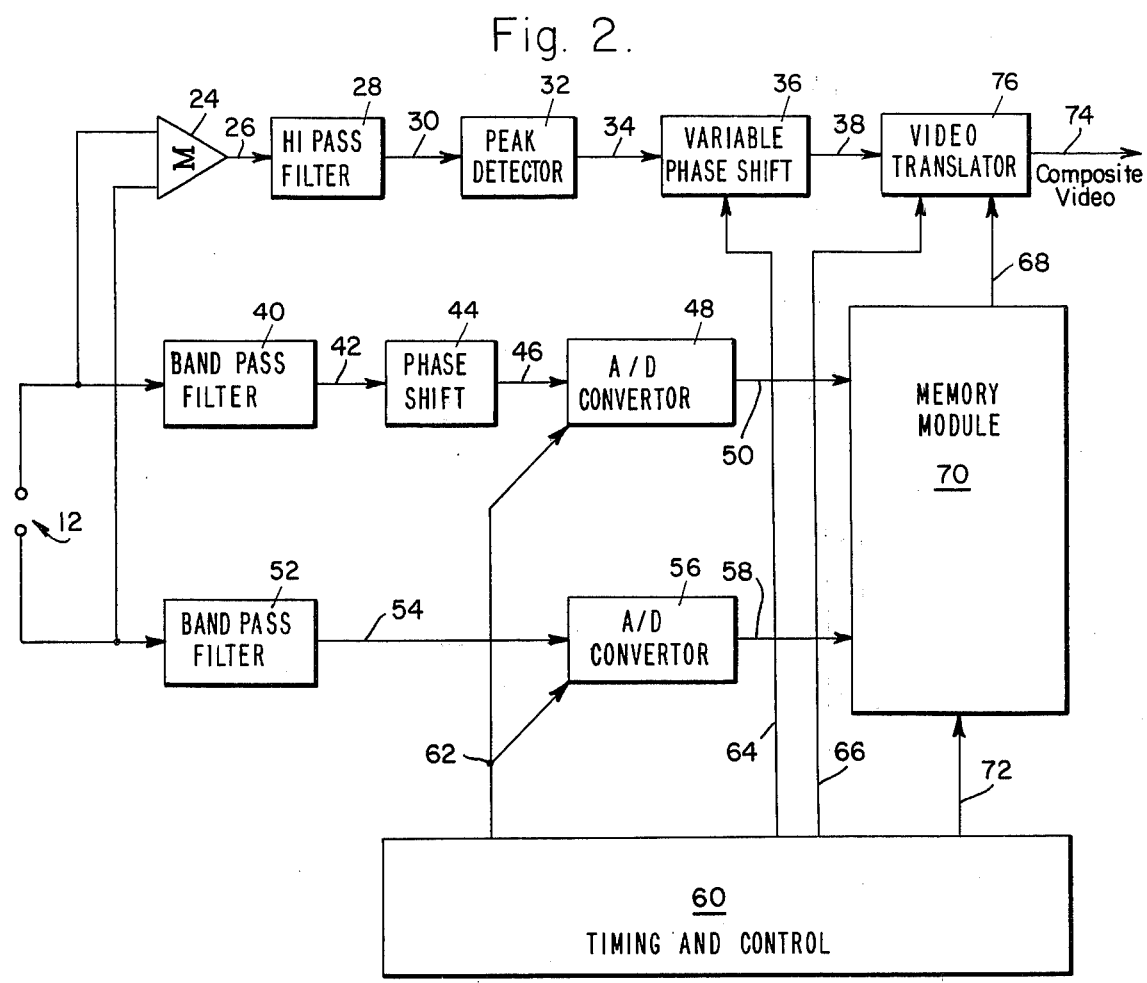
FIG. 2 is a block diagram of the system of the invention.

Referring now to FIG. 2 the processing of the audio signal appearing on composite 12 will be further explained. Simple amplification of the audio signal can produce useable images, however, it has been determined that other forms of processing will enhance the images as produced by the system of the invention. Low pass filtering of the input waveform produces more pleasing images because such filtering can emphasize the most desirable information in the audio waveform. This processing results in less cluttered images while correlation with the audio signal is maintained. It is a fact of experience that most rhythm, harmony and/or melodic information in music, and almost all essential information in voice waveforms, in contained in the audio frequency region below one kilohertz. The explicit elimination of signal information above an abnormally low audio frequency is one of the novel features as implemented in the system of this invention. It is also to be noted that high pass filtering can be used to eliminate low frequency noise and rumble components present in an audio signal. It has been found necessary to provide for some sort of vertical-horizontal separation so that all points of an incoming signal do not lie upon a single diagonal line. For example, if a sine wave is shown plotted parametrically by means of an X-Y plot against a sine wave of the same frequency and referred to the same phase, a diagonal line results. It has thus been found necessary to use a phase shifter in one of the audio channels of the system of the invention. A 90° all-frequency, all-pass phase shifter would be ideal, but in actual practice, a simple all-pass phase shifter with frequency dependent phase performs well, however, it is necessary to choose the response characteristic of such a circuit with some care.

With reference to FIG. 2, the audio input signal is received on input leads 12 and simultaneously applied to function amplifier 24, band pass filter 40 and band pass filter 52. Output from function amplifier 24 is applied by means of lead 26 to high pass filter 28. After filtering, the signal is applied by means of lead 30 to peak detector 32 whence it is applied by means of lead 34 to variable phase shifter 36. Video translator 76 receives the processed signal from variable phase shifter 36 by means of lead 38. Band pass filter 40 applies its output by means of lead 42 to phase shifter 44 which applies the phase shifted signal to analog-to-digital converter 48 by means of lead 46. Band pass filter 52 applies its output by means of lead 54 to analog-to-digital converter 56. Analog-to-digital converters 48 and 56 apply their outputs to memory module 70 by means of leads 50 and 58 respectively. The timing and control functions of the system exemplified here by numeral 60 apply their outputs by means of leads 64 and 66 to variable phase shifter 36 and video translator 76 respectively. A signal from timing and control section 60 also is applied to memory 70 by means of lead 72. Memory 70 applies an output signal to video translator 76 by means of lead 68. Timing and control circuitry 60 also applies timing and control signal to analog-to-digital converters 48 and 56 by means of lead 62. The composite video signal furnished by the system appears on lead 74. It is important to note that the scheme used in the invention derives the control signal furnished to the video translator by peak detecting the audio signal and then allowing the detected signal to decay with a time constant that is long compared to the envelop's apparent frequency. Thus, rather than following the music's audio envelope to effect a change of colors, the present invention samples only the peaks, holding colors on large parts of the television display screen for longer periods of time than heretofore, and, therefore, does not present the irritating quality of flashing that an envelop follower can have.

A color sub-carrier as illustrated in FIG. 3, may be derived by implementing a voltage controlled phase shifter. In this way, a sub-carrier of constant amplitude but varying phase is produced which can be added to a video signal to give a complete composite video output. In the implementation illustrated, a 3.58 megahertz square wave signal is applied by means of lead 82 to a one shot multivibrator 84, the pulse width of which is controlled by means of variable voltage into lead 80. The output from one shot multivibrator 84 is fed by means of lead 86 to one shot multivibrator 88, which generates an output pulse with width equal to one half of the original period. The 3.58 megahertz phase shifted output appears on lead 90. There has thus been produced a subcarrier of constant amplitude but varying phase. An implementation of a circuit that performs the function of peak detecting an audio signal then allowing the detected signal to decay with a time constant that is long compared to the envelope's apparent frequency is illustrated in FIG. 4. Diode D prevents holding capacitor C from discharging back into the waveform source. Resistor $R_d$ determines the discharge time constant of the R C circuit. $R_c$ is a resistor that can be used to adjust the charging characteristics of capacitor C.

A 60 hertz line signal can be used in combination with an audio signal or instead of it, either to control the voltage controlled phase shifter directly, or as the input to a peak detection circuit such as described previously. The unique properties exhibited by this method result from a fortuitous set of circumstances as may be illustrated by reference to FIG. 5. The frequency at which a new scan is initiated in standard color television is 59.94 hertz, while line frequency is 60 hertz in the United States of America and many other places as well. As shown in FIG. 5, each voltage level of the 60 hertz sine wave corresponds to a different color. Note that on succeeding scans, each level appears at a different position on the screen, where $V_s$ is used as a reference level. If the two frequencies were exactly equal, a complete color spectrum would be stable on the screen with all colors present and smoothly flowing into each other. However, because of the frequency difference, the patterns all shift on the screen and move slowly upward coming back to the same condition every few seconds. This slow shifting of colors can be very pleasing to a viewer.

Figure 6:
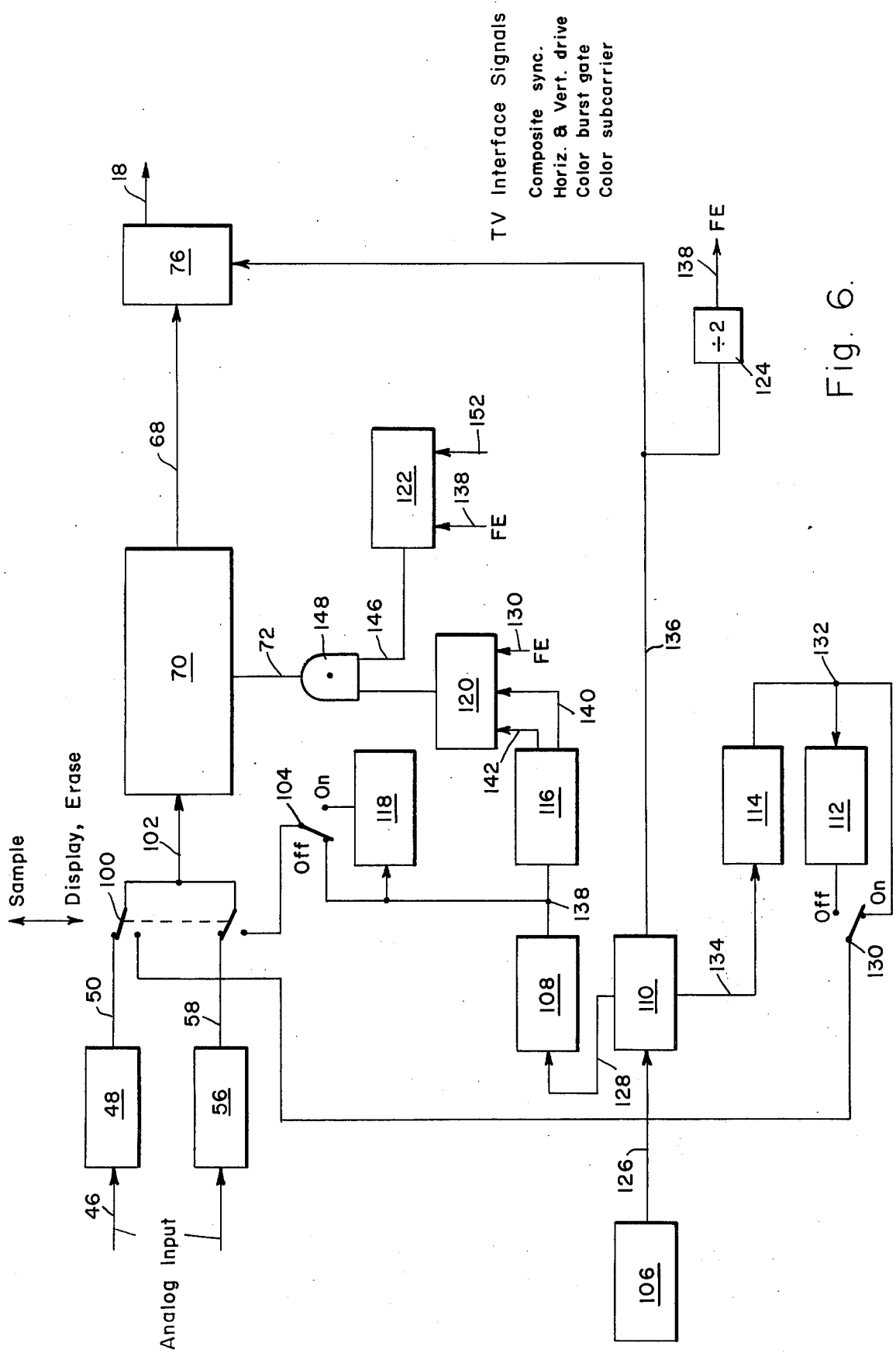
FIG. 6 is a detailed block diagram of the digital logic as employed in the systems of the invention.

Referring now to FIG. 6 the digital part of the invention will be more fully described. As is well known in the art a standard television display can be divided into 65,536 picture elements, that is, 256 horizontal elements wide by 256 television lines high. In the system of the invention the analog input channels are converted into 16-bit words. Each conversion of input data defines a single picture element. The 16-bit input word resulting is multiplexed with the timing address used for memory readout. When the system is sampling the input, the multiplexer switch 100 switches in the outputs of the analog-to-digital converters. When the system is displaying or erasing memory contents, the multiplexer inputs the timing addresses. An illustrated, analog-to-digital converters 48 and 56 receive analog input signal respectively on lead 46 and 54. After analog-to-digital conversion is performed, the output signals from analog to digital converters 48 and 56 are supplied to system memory 70 by means of multiplexer switches 100 and lead 102.

A stable reference oscillator 106 provides a frequency reference on a lead 126 used to generate all systems timing signals. Television synchronizing generator 110, which conforms to RS 232 standards, receives its reference signal input from reference oscillator 106 on a lead 126 and furnishes output timing signal information to horizontal counter 108, vertical counter 114 and vertical drive signal on leads 128, 134, and 136 respectively. Vertical counter 114 furnishes its output signal to symmetry logic circuit 112 by means of lead 132 and also to switch 100 by means of switch 130 which also supplies the output signal from symmetry logic circuit 112 to switch 100 as appropriate during the display/erase period. Horizontal counter 108 applies its output signal to horizontal decoder 116 and symmetry logic circuit 118 by means of lead 138. Symmetry logic circuit 118 applies its output signal as appropriate to switch 100 during the display/erase period by way of switch 104. Horizontal decoder 116 applies its output signal comprising a sample enable signal on lead 142 and an erase signal on lead 140 to write logic circuit 120. Write logic circuit 120 furnishes its output signal to logic AND circuit 148 on lead 144. Logic AND circuit 148 receives its other input from hold counter circuit 122 by way of lead 146. Logic AND circuit 148 applies its output signal to memory 70 by means of lead 72. The vertical drive signal appearing on lead 136 is furnished to video mixer 76 and to divide-by-2 circuit 124 from which is derived the FE signal on lead 138. The FE signal is supplied to hold counter 122, write logic circuit 120 and other system elements as appropriate. Hold counter circuit 122 may also receive a signal related to a desired hold length on a lead 152. Video mixer 76 receives the output signal from memory 70 on lead 68 and derives therefrom the composite video signal that is its output on line 18.

Referring now also to FIG. 7, the periods defined by the read, erase and sample pulses define one horizontal clock period. Each horizontal period defines a single horizontal picture element. Horizontal counter 108 generates the address for horizontal display while symmetry logic circuit 118 allows half of the display to be mirror imaged. The horizontal counter also effects generation of sample, enable and erase signals.

The vertical drive signal and the FE signal derived therefrom are also illustrated in FIG. 7. Vertical counter 114 of FIG. 6 generates an 8-bit vertical address and also provides input to a symmetry logic circuit 112. Implementation of both horizontal and vertical symmetry logic circuits produces quarter symmetry.

Thus each horizontal element is divided into a read, an erase and a sample interval. A picture element is first addressed, then displayed on the television screen, then erased from memory and finally, to complete the cycle, a new sample is wirtten into the memory. The FE signal allows erasing to occur only on every other field. The write logic circuit 120 generates the signal which determines when the memory 70 will sample or erase. Hold circuit 122 allows the image to be held for N frames, a frame being two fields in one illustrative implementation and N being adjustable by auxiliary circuit means not shown. Logic AND circuit 148 will thus present a true signal to memory 70 on lead 72 only when the write logic signal on lead 144 and the hold signal on lead 146 are both true.

Video mixer 76 combines the digital video appearing as output signal from memory 70 on lead 68 with television interference signals on lead 136 to produce a 525-line, RS 232 compatible composite video signal on lead 18. This composite video signal on lead 18 can drive a television display monitor directly or it can modulate a transmitter thus allowing display on a standard television receiver.

There has thus been described a variable coordinate sonic display system which will accept the display audio signals from a variety of input devices on a television display screen in a pleasing pattern and color format. All system timing and control functions are internally derived thus achieving a simplicity of implementation not heretofore realized in systems of this type. Since it is unnecessary to modify an existing television receiver in order to use the apparatus of the invention, a significantly reduced cost of ownership is realized.

It is here pointed out that although the present invention has been shown and described with reference to particular embodiment, nevertheless, various changes and modifications obvious to one skilled in the art to which the invention pertains are deemed to lie within the purview of the invention.

What is claimed is:

1. A digital auxiliary variable coordinate sonic display system comprising in combination:
   at least two input filters for receiving and filtering an audio input signal;
   a first phase shifter for receiving the filtered audio input signals and shifting the phase of at least one of the filtered audio signals;
   a pair of analog-to-digital converters for receiving the filtered and phase shifted audio signals and converting them to digital form;
   a digital memory for receiving the digital audio signals and providing storage therefor;
   timing and control means for providing timing and control signals to said analog-to-digital converters and to said digital memory;
   a function amplifier for receiving and forming a function derived from an audio input signal;
   a high pass filter for receiving the derived function from said function amplifier;
   a peak detector for receiving the output signal from said high pass filter;
   a second phase shifter receiving the output of the peak detector and shifting the phase of the peak detected signal; and
   a video translator for receiving the output signal from said second phase shifter and combining said output signal with an output signal from said digital memory to form a composite video signal.

2. The system of claim 1 in which the at least two input filters are band pass filters.

3. The system of claim 1 in which said function amplifier derives the summation function.

4. The system of claim 1 in which said second phase shifter is a variable phase shifter.

5. A method of providing an auxiliary coordinate sonic display for a television receiver comprising the steps of:
  receiving an audio input signal;
  filtering said received audio input signal;
  phase shifting at least one compoinent of said received audio signal;
  analog-to-digital converting said filtered and said phase shifted audio signal;
  storing said analog-to-digital converted signal in a digital memory;
  forming a function of said received audio signal;
  high pass filtering said formed function of said received audio signal;
  peak detecting said high pass filtered audio signal;
  phase shifting said peak detected audio signal;
  video translating said peak detected audio signal; and
  combining said video translated signal with said stored signal to form a composite video signal.

6. A digital auxiliary coordinate sonic display system comprising in combination:
  means for receiving an analog audio input signal;
  means for filtering said analog audio input signal;
  means for shifing the phase of said analog audio input signal;
  means for deriving a function of said analog audio input signal;
  means for filtering said derived function of said analog audio input signal;
  means for peak detecting said filtered, derived function of said analog audio input signal;
  means for converting said filtered analog audio input signal to digital form;
  means for converting said phase shifted analog audio input signal to digital form;
  memory means for storing said digital form signals;
  means for shifting the phase of said peak detected, filtered, derived function of said analog audio input signal; and
  video translator means for receiving said output signal from said means for shifting the phase of said peak detected, filtered, derived function of said analog audio input signal along with an output signal from said memory means and combining said output signals to form a composite video signal.

7. The system of claim 6 wherein said means for filtering said derived function of said analog audio input signal is a high pass filter.

8. The system of claim 6 comprising:
  reference oscillator means supplying reference input signal for system timing;
  television sync generator means receiving reference input signal from said reference oscillator and deriving therefrom system timing signals;
  vertical counter means receiving system timing signal from said television sync genetator means;
  first symmetry logic means receiving input signal from said vertical counter means;
  horizontal counter means receiving system timing signal from said television sync generator means;
  second symmetry logic means receiving input signal from said horizontal counter means;
  horizontal decoder means receiving input signal from said horizontal counter means;
  write logic means receiving input signal from said horizontal decoder means;
  multiplexer means for supplying system signals to said memory means;
  hold counter means for predetermining image length of time of display;
  logic AND means receiving input signal from said write logic means and said hold counter means and supplying its output to said memory means; and
  divide-by-2 means receiving reference input signals from said television sync generator means and furnishing timing signals to said hold counter means and said video translator means.

* * * * *